United States Patent [19]

Oishi et al.

[11] Patent Number: 4,742,416
[45] Date of Patent: May 3, 1988

[54] MAGNETIC TAPE CASSETTE WITH U-SHAPED SLIDE GUARD

[75] Inventors: Kengo Oishi; Choji Komiyama, both of Kanagawa, Japan

[73] Assignee: Fuji Photo Film Co., Ltd., Kanagawa, Japan

[21] Appl. No.: 780,759

[22] Filed: Sep. 27, 1985

[30] Foreign Application Priority Data

Oct. 1, 1984 [JP] Japan ............................ 59-148793[U]
Oct. 1, 1984 [JP] Japan ............................ 59-148794[U]

[51] Int. Cl.$^4$ .............................................. G11B 23/02
[52] U.S. Cl. ..................................... 360/132; 242/198
[58] Field of Search ................ 360/132; 242/197, 198, 242/199

[56] References Cited

U.S. PATENT DOCUMENTS

| | | | |
|---|---|---|---|
| 3,259,331 | 7/1966 | Liddle | 242/198 |
| 3,796,394 | 3/1974 | Souza | 360/132 X |
| 4,516,181 | 5/1985 | Shirako | 360/132 |
| 4,541,581 | 9/1985 | Hara | 242/198 |
| 4,572,461 | 2/1986 | Horikawa et al. | 360/132 X |
| 4,576,345 | 3/1986 | Koken et al. | 242/198 |
| 4,620,254 | 10/1986 | Smith, II | 360/93 X |
| 4,625,253 | 11/1986 | Kawakami et al. | 360/132 |
| 4,660,784 | 4/1987 | Sumida et al. | 360/132 X |
| 4,676,453 | 6/1987 | Komiyama et al. | 242/199 |

FOREIGN PATENT DOCUMENTS

| | | | |
|---|---|---|---|
| 0144802 | 6/1985 | European Pat. Off. | 360/96.1 |
| 0147172 | 9/1982 | Japan | 360/132 |
| 0128068 | 7/1983 | Japan | 360/132 |

*Primary Examiner*—John H. Wolff
*Assistant Examiner*—Andrew L. Sniezek
*Attorney, Agent, or Firm*—Sughrue, Mion, Zinn, Macpeak and Seas

[57] ABSTRACT

A miniature audio tape cassette is provided with a slide guard which normally covers the reel insertion holes of the cassette when the cassette is not in use. The slide guard is engaged with the cassette body by inserting portions of the same between the assembled upper and lower cassette halves. In one embodiment, the slide guard is provided with an engaging part which includes a portion slidable along the inside surface of the upper cassette half. The upper surface of this sliding portion is tapered in order to facilitate assembly of the slide guard, the upper cassette half, and the lower cassette half. According to a second embodiment, the slide guard is provided with inwardly extending portions which form overhangs with respect to the lower cassette halves. The engaging portion abuts against a flanged surface of the upper cassette half and has a tapered portion which engages a similarly tapered surface of the sides of the lower cassette halves. Alternatively, the overhang may be provided in a shape of a cup, forming a groove, and the flat upper surfaces of the side walls of the lower cassette body are slidably received within the groove so formed.

6 Claims, 2 Drawing Sheets

MAGNETIC TAPE CASSETTE WITH U-SHAPED SLIDE GUARD

The present invention relates to the copending application, Ser. No. 769,649, filed Aug. 27, 1985 and assigned to the common corporate assignee.

BACKGROUND OF THE INVENTION

The present invention relates to magnetic tape cassettes, and more particularly to a novel audio compact cassette which is equal to or smaller than a "Phillips" type compact cassette.

Recently, cassette tape recorders have been reduced both in size and in weight, and accordingly magnetic tape cassettes have also been miniaturized. Therefore, there has been a strong demand for the provision of small magnetic tape cassettes which are suitable for high quality high density long play recording and reproducing operations. Magnetic tape cassettes satisfying this requirement are operated according to a digital system such as a PCM (pulse code modulation) system in which recording and reproducing operations are carried out with the input signals being converted into pulse signals. In this system, the recording frequency band must be about five times as wide as that of a conventional audio tape. Therefore, video tape cassettes of a size larger than compact audio cassettes are extensively employed with this recording system.

Video tape cassettes are typically operated in a so-called rotary head system. The video tape cassettes have a guard panel which is upwardly swingable and which closes the opening formed in the front part of the cassette. The guard panel prevents the entrance of dust and protects the magnetic tape from damage.

The invention relates to a very small magnetic tape cassette which, as in video tape cassettes, employs a relatively wide frequency band recording and reproducing system. The cassette is usable with audio devices, and is equal to or smaller in size than the conventional compact audio cassette. It is envisioned that the present magnetic tape cassette may be frequently used outdoors and in other less than ideal circumstances. In addition, it is expected that the tape cassette will be carried without its storage case, similarly to audio tape cassettes. Accordingly, the invention provides a construction which is impact resistant, highly dust proof, and less susceptable to jamming than conventional cassettes.

Similar digital audio type magnetic tape cassettes have been proposed in the art. For example, co-pending application Ser. No. 783,397, filed Sept. 9, 1985 now U.S. Pat. No. 4,719,529 (59-153111) discloses a magnetic tape cassette having a guard panel which is swingable upwardly as in the typical video tape cassette, and a slide guard which is slidable back and forth on the bottom of the cassette. The slide guard is urged forwardly in order to close the lower part of the opening formed in the front part of the cassette. That is, it is urged to close a part of the opening through which the tape withdrawing member of the magnetic tape recording and reproducing device is inserted into the cassette.

The slide guard is engaged by suitable members within the reproducing device and is slid towards the rear end of the cassette to open this opening when the cassette is used. Therefore, it is necessary that the slide guard be shaped and designed so as to be easily slidable on the cassette body. Furthermore, in order to miniaturize the cassette body, it is essential for the slide guard to be made of a thin plate material or the like.

The slide guard may be formed by molding plastic material or by using a thin metal material. However, the slide guard thus formed has deficiencies in that the slide guard may readily be removed from the cassette body by plastic deformation over time, or deformation due to molding strain or external mechanical pressure. Of course, a shock imparted to the cassette body when the same is dropped, for example, can cause the slide guard to come off of the cassette.

SUMMARY OF THE INVENTION

An object of the present invention is to eliminate the above described difficulty. More specifically, an object of the present invention is to provide an audio magnetic tape cassette including a slide guard having improved impact resistance, which is effective in dust proofing, and which may be assembled efficiently with the remainder of the tape cassette.

The foregoing and other objects of the invention have been achieved by the provision of a magnetic tape cassette comprising upper and lower half cases which incorporate a pair of hubs on which a magnetic tape is wound, an opening through which the magnetic tape can be withdrawn from the cassette, a guard panel adapted to close the front part of the opening, a slide guard adapted to close the lower part of the opening, and a locking member for locking the hubs, wherein the slide guard is a plate member which is forwardly and rearwardly slidable on the outer surface on the lower half case of the cassette, the slide guard being substantially U-shaped in vertical section and having right and left side pieces at either end thereof which rise in such a manner as to extend along the side walls of the cassette. The right and left side pieces are integral with L-shaped engaging parts which are adapted to engage the inner surfaces of the right and left side walls of the upper half case of the cassette. Alternatively, the side pieces may be provided with upper edges engaged with inner surfaces of the side walls of the lower cassette half, to the same effect.

DETAILED DESCRIPTION OF THE PREFERRED EMBODIMENTS

Figure 1:
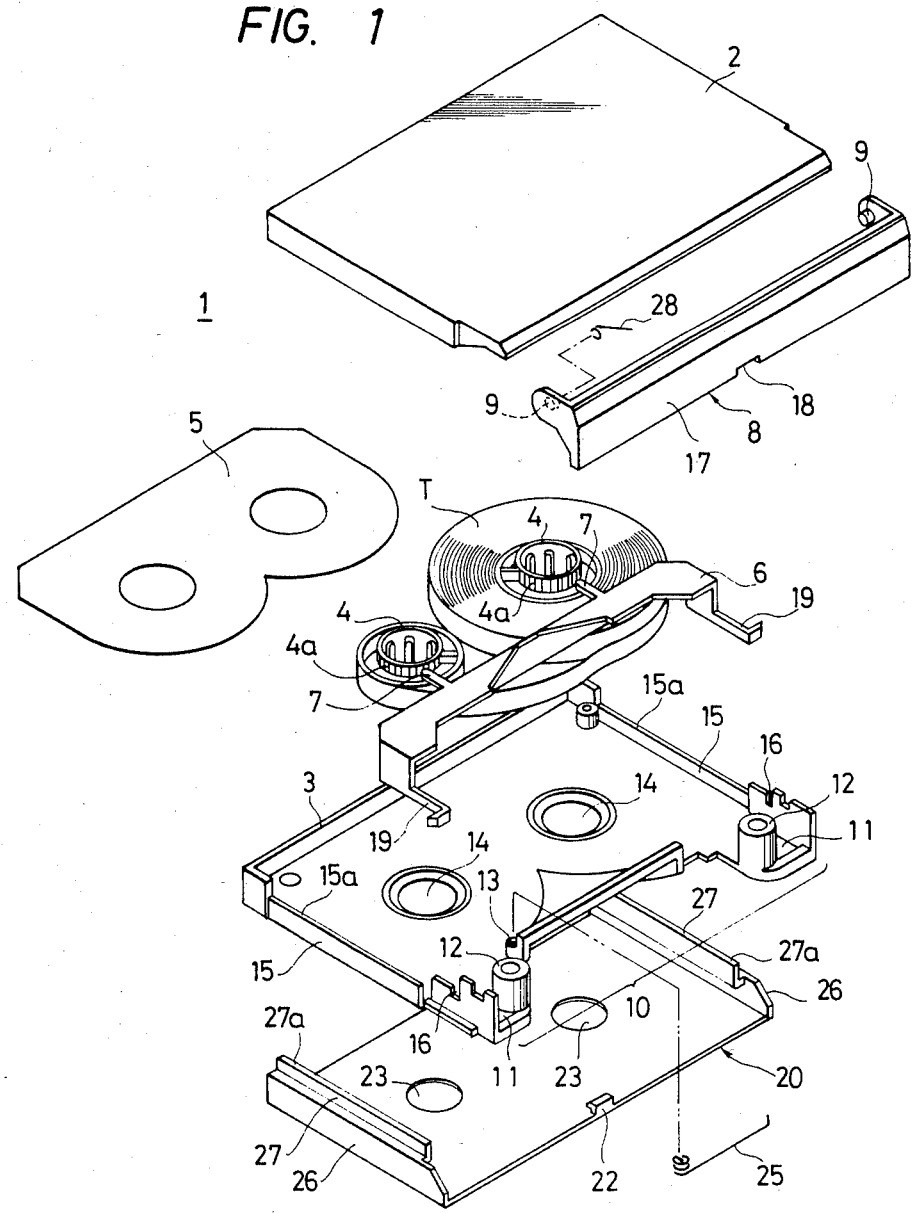
FIG. 1 is an exploded perspective view of a magnetic tape cassette according to one embodiment of the present invention.

FIG. 1 illustrates a magnetic tape cassette 1 according to a first embodiment of the invention. The cassette 1 is equal to or smaller in size than a conventional compact cassette. The cassette 1 comprises a cassette case made up of lower and upper half cases 3, 2 of transverse U-shaped and inverted U-shaped cross section, respectively. The cassette case incorporates a pair of hubs 4 on which a magnetic tape T is wound, friction sheets 5 for allowing the hubs 4 to rotate smoothly, and a locking member 6 for preventing unwanted rotation of the hubs. The cassette 1 further comprises a guard panel 8 adapted to close the front part of the opening 10 formed in the front part of the cassette case, and a slide guard 20 which is adapted to close the lower part of this opening.

Figure 2:
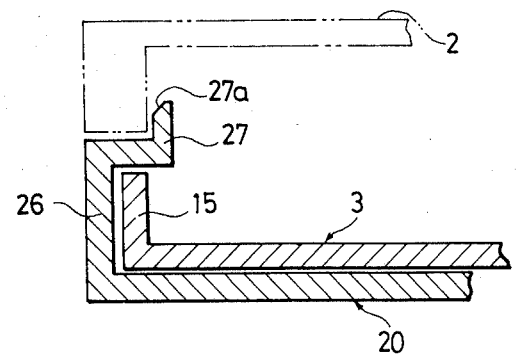
FIG. 2 is a sectional view showing the engagement between the slide guard and the upper and lower halves of the cassette body.

The slide guard 20 is provided substantially in the form of a thin plate. The slide guard 20 is bent at right angles to provide side pieces 26 at both sides which extend along the side walls 15 of the lower half case 3. That is, the slide guard 20 is substantially U-shaped in vertical section. The side pieces 26 extend inwardly of the slide guard 20, thus forming engaging parts or overhangs 27 which are bent so that they will extend inwardly of the cassette case when the cassette is assembled. The engaging parts may engage with the inner surfaces of the right and left side walls of the upper half case 2, which is combined with the lower half case 3. In this event, each of the engaging parts 27 is provided with an edge 27a which is inclined inwardly of the slide guard 20 as shown in FIG. 2. This arrangement facilitates the installation of the upper cassette half over the lower cassette half and the slide guard, by providing guide surfaces.

Figure 3:
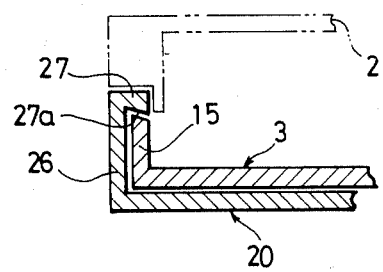
FIG. 3 is a view similar to FIG. 2, showing an alternative arrangement.
Figure 4:
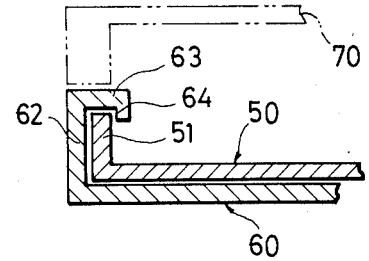
FIG. 4 is another view similar to FIG. 2, showing an additional alternative arrangement.
Figure 5:
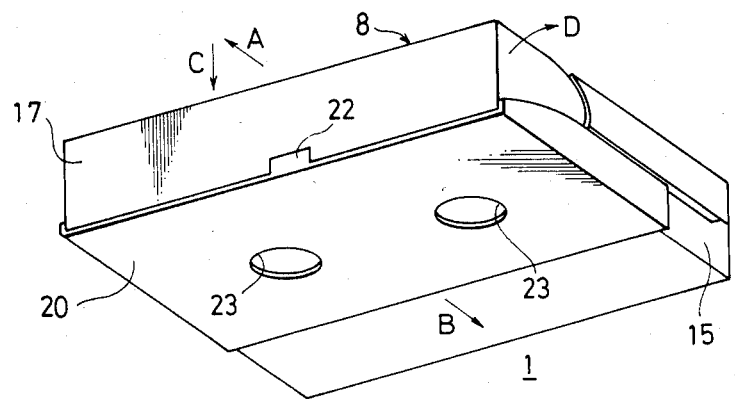
FIG. 5 is a perspective view showing the magnetic tape cassette as assembled.

Alternatively, the lower surface 27a of each overhang 27 may be a tapered surface inclined toward the respective side pieces 26, as shown in FIG. 3. Instead of the tapered surface, a cup-shaped configuration may be provided, as shown in FIG. 4. This configuration is helpful in preventing the slide guard from being removed even in the case of elastic deformation or the like of the cassette body itself.

Steps 15a are formed on the upper edges of the side walls 15 of the lower half case 3, so that when the cassette is assembled, slits are formed which extend along the side walls. The steps 15a may have tapered surfaces as shown in FIG. 3, engaged with the tapered surfaces of the overhangs 27 of the slide guard 20. If the tapered portion 27a is not provided, the upper surface of the step 15a is maintained flat.

Similarly to the conventional video tape cassette, the lower half case 3 is provided with a pair of reel shaft insertion holes 14 aligned with the hubs 4, and tape withdrawing openings 11 at both ends of the front opening 10. The magnetic tape T can be pulled out of the cassette via these openings. The bottom of the lower half case is formed such that the part thereof between the openings 11 is set back towards the rear end of the cassette. In other words, when the magnetic tape cassette 1 is loaded in a recording and reproducing device, the tape withdrawing member of the same can be inserted into the cassette from below.

Through holes 23 are formed in the slide guard 20 in such a manner that the through holes may be aligned with the shaft insertion holes 14. An engaging protrusion 22 is formed on the inner surface of the slide guard 20. A slide guard spring 25 is adapted to urge the slide guard 20 in the forward direction such that the protrusion 22 is received within a cut portion 18 provided in the guard panel 8.

The hubs 4 have annular portions 4a which protrude coaxially from the tape reels, and which are engaged by engaging parts 7 of the locking member 6. As described below, the locking member 6 is allowed to move into the locking position upon the closure of the guard panel 8.

The guard panel 8 is substantially U-shaped in horizontal section, similarly to that of a conventional video tape cassette. Its right and left end pieces 17a have rotary supporting shafts 9, respectively, which protrude toward each other. The guard panel 8 is mounted on the cassette body in such a manner that the rotary supporting shafts 9 are rotatably engaged with holes 16 formed in the side walls 15 of the lower half case 3 when the upper and lower half cases 2 and 3 are joined together, or holes (not shown) which are formed in one of the upper and lower half cases 2, 3. The guard panel 8 is urged by a spring 28 to close the opening 10.

The guard panel 8 has a cut 18 at the middle of the lower edge of the front wall 17 thereof. The cut 18 is used to correctly load the magnetic tape cassette 1 in the magnetic tape recording and reproducing device. That is, only when an erroneous insertion preventing protrusion provided in the cassette loading section of the recording and reproducing device enters the cut 18 can the cassette be correctly loaded in the recording and reproducing device.

The front part of the upper case 2 is designed so that when the upper half case 2 is combined with the lower case 3, the aforementioned tape withdrawing openings 11 are formed therebetween. Means (not shown) for regulating the rotational positions of the hubs 4 is provided on the inner surface of the lower half case 2.

The magnetic tape cassette 1 is assembled as follows. First, the slide guard 20 is mounted on the lower surface of the lower half case 3. More specifically, the slide guard 20 is slid along the lower half case from the front in such a manner that the lower surfaces of the engaging parts 27 are engaged with the steps 15a of the side walls 15 of the lower half case 3, respectively. The upper portion 27a thus extends above the lower portion of the side wall of the upper cassette half 2 (FIG. 2). In the case of the arrangement shown in FIG. 3, the lower surfaces 27a of the overhangs 27 are engaged with the upper edges of the side walls 15 of the lower case 3. In other words, the lower surfaces 27a of the overhangs 27 slide on the steps 15a of the side walls 15.

One end of the slide guard spring 25 is fitted on a locking pin 13 formed on the lower half case 3, while the other end is engaged with the engaging protrusion 22. Therefore, the slide guard 20 is urged toward the front end of the cassette by the spring 25, and is slidable back and forth with respect to the bottom of the cassette. When the slide guard 20 is at its forward position, the apertures therein are not aligned with the insertion holes 14 of the lower half case of the cassette.

The upper half case 2 has a stopper (not shown) for preventing the slide guard 20 from springing out. The slide guard 20 is held on the cassette body by joining the upper and lower half cases 2 and 3 together.

Thereafter, the hubs 4 on which the magnetic tape T has been wound are placed on the friction sheet 5 placed on the inner surface of the lower half case 3 in such a manner that the hubs are in alignment with the reel shaft insertion holes 14, respectively. Then, the magnetic tape T is partially pulled out of the cassette through the openings 11 and is laid over right and left-hand tape guides 12. In this condition, another friction sheet 5 is placed over the hubs 4 and then the locking member 6 is placed on the friction sheet 5. The locking member 6 is urged towards the rear end of the cassette by a locking member spring or similar elastic means (not shown) so that the same is slidable forwardly and rearwardly of the cassette.

When the upper half case 2 is combined with the lower half case 3, the rotary supporting shafts 9 of the guard panel 8 are rotatably engaged with the holes 16, respectively. The guard panel 8 itself is urged by means of the guard panel spring 28 in a direction which will close the opening 10. When the upper and lower half cases 2 and 3 are joined together as described above, the upper half case 2 is smoothly received by the engaging parts 27 of the slide guard 20. Especially in the arrangement of FIG. 2, the engaging parts 27 have tapered edges 27a which contribute to an improvement in the assembly efficiency of the cassette.

After the upper half case 2 is placed on the lower half case 3 as described above, the cases 2 and 3 are tightly joined with screws or the like.

When the magnetic tape cassette 1 is in storage (not in use), the guard panel 8 and the slide guard 20 close the opening 10, and the elongated engaging parts 7 of the locking member 6 are abutted against the annular parts 4a of the hubs 2 to prevent unwanted rotation of the hubs 4.

The upper and lower half cases 2 and 3, the guard panel 8, and the locking member 6 may be made of a plastic resin such as polyacetal resin, ABS or PS resin, as in the case of a conventional magnetic tape cassette, and the slide guard 20 may also be made of the same plastic resin. The slide guard 20 is preferably made of the same material as the upper and lower half cases 2 and 3, because if the slide guard 20 is made of a metal, repeated sliding of the slide guard may scrape the plastic cassette body.

The magnetic tape T may be a magnetic iron oxide or chromium dioxide tape; however, is desirable to employ a magnetic tape such as a metal tape or vacuum deposition tape which is suitable for high density recording and reproduction operations.

In loading the magnetic tape cassette in the magnetic tape recording and reproducing device, the various parts operate as follows:

In order to load the magnetic tape cassette in the magnetic tape recording and reproducing device, the opening 10 is held forwardly (in the direction of the arrow a). In the cassette insertion operation, the engaging protrusion of the slide guard 20 is, for instance, abutted against the erroneous insertion preventing protrusion in the cassette insertion section so that the slide guard is made to slide toward the rear end of the cassette (in the direction of arrow b). In this operation, the walls of the engaging parts 27 are in sliding contact with side walls of the upper and lower cases. In particular, in the embodiment of FIG. 2, the engaging parts 27 are in sliding contact with the inner surfaces of the side walls of the upper half case 2. In the embodiments of FIGS. 3 and 4, the slide guard slides along lower surfaces of the upper cassette half 2, and slides along the upper surface of the lower half cassette 3, either via tapered surfaces 27a, or the flat surface in FIG. 4. As the slide guard is moved toward the rear of the cassette, the lower part of the opening 10 is opened, and the through holes 23 become aligned with the reel shaft insertion holes 14, such that the hub driving reel shafts may be inserted therethrough.

Thereafter, the magnetic tape cassette 1 is moved in a direction perpendicular to the direction of insertion, i.e., downwardly (in the direction of arrow c). In this operation, the lower edge of the guard panel 8 is abutted against guard panel opening means provided at an inner part of the cassette insertion section, so that the guard panel is swung upwardly (in the direction of arrow d) with the rotary supporting shafts 9 serving as a rotational axis.

As the guard panel 8 is opened, the right and left end pieces of the guard panel 8 engage the end portions of the right and left extension pieces 19 of the locking member 6, to slide the latter toward the front end of the cassette. As a result, the hubs 4 are disengaged from the locking member 6 so that the same may be freely turned.

When the loading of the magnetic tape cassette has been accomplished by inserting the same and moving the same downwardly, and the opening 10 has been completely opened by sliding the slide guard 20 and by swinging the guard panel 8 upwardly, the annular parts 4a of the hubs are disengaged from the engaging portions 7. As a result, the magnetic tape T can be partially pulled out of the cassette, while the hubs can be turned. Thus, a recording or reproducing operation can be performed according to a rotary head system.

In unloading the magnetic tape cassette from the magnetic tape recording and reproducing device, the cassette 1 is moved oppositely in comparison with the loading operation. First, the guard panel 8 is disengaged from the guard panel opening means, thus closing the front part of the opening 10 with the aid of the guard panel spring 28. As the magnetic tape cassette 1 is removed, the slide guard 20 is disengaged from the erroneous insertion preventing protrusion, so that the slide guard slides toward the front end of the cassette by means of the slide guard spring 25. As a result, the opening 10 becomes completely closed.

As the guard panel 8 swings to close the opening 10, the right and left end pieces of the guard panel 8 are disengaged from the extension pieces 19 of the locking member 6. As a result, the locking member 6 slides toward the rear end of the cassette by means of the elastic force of elastic means such as a spring (not shown), so that the engaging parts 7 of the locking member 6 are abutted against the annular portions 4a of the hubs, thus locking the hubs. As the slide guard 20 slides so as to close the opening 10, the reel insertion holes 14, displaced from the through holes 23, are closed.

As is apparent from the above description, when the magnetic tape cassette of the invention is not in use, the opening 10 is maintained completely closed by the guard panel 8 and the slide guard 20, and the reel shaft insertion holes 14 are closed by means of the slide guard 20. Therefore, the magnetic tape T in the cassette is protected from damage and dust. In the embodiment of FIG. 2, the slide guard 20 is mounted on the cassette body with the vertical walls of the engaging parts 27 maintained in sliding contact with the inner surface of the side walls of the upper half case 2, and therefore the entrance of dust or the like through the slits at the sides of the cassette is prevented, and the recording and reproducing characteristics of the magnetic tape can be maintained unchanged. As the engaging parts 27 have upper tapered edges as shown at 27a in FIG. 2, the upper half case 2 is smoothly received by the engaging parts 27 when the upper and lower half cases are combined, contributing to an improvement in assembly efficiency.

In the arrangement according to FIG. 3, the engaging part 27 is provided with an overhang in the form of a tapered portion 27a, which smoothly engages a like tapered portion on the upper surface of the lower cassette half 3. The overhang 27 extends along the entire width of the cassette body. However, in an alternative arrangement, the slide guard 20 may be modified such that each side piece 26 is provided with two or more overhanging extensions 27 in spaced relation. In FIG. 3, dust is prevented from entering the cassette case by means of the flanged engagement of the upper cassette portion 2 with the engaging portion 27.

In the third embodiment shown in FIG. 4, the lower edge of each side wall 21 of the lower half case 50 is flat, as compared with the tapered arrangement of FIG. 3. Similarly to the slide guard shown in FIG. 3, the slide guard 60 is in the form of a thin plate bent at right angles to have side pieces 62 extending along the side walls 51 of the lower half case 50. The upper edges of the side pieces 62 extend inwardly of the slide guard, thus forming overhangs 63 which confront each other. Each of the overhangs 63 is bent downwardly at the end, thus forming a cup-shape or a groove 64 together with a side piece 62. The side walls 51 of the lower half case 50 are inserted into the groove 64 thus formed, to mount the slide guard 60 on the lower half case 50. Other components of the embodiment of FIG. 4 are the same as those in FIG. 3, and the operation of this embodiment is the same.

In the arrangements of FIGS. 3 and 4, the overhanging engagement parts 27 have tapered lower surfaces 27a, or are formed into engaging grooves 64. Therefore, even if the slide guard 20 (60) is subjected to plastic deformation such as bending to open the side pieces 26 (62) the slide guard will not come off of the cassette body owing to the engagement arrangement. The provision of this disengagement preventing structure will not decrease the slidability of the slide guard with respect to the lower cassette half.

Although the present invention has been described as applied to a digital audio magnetic tape cassette whose size is equal to or smaller than that of a conventional compact audio cassette, the invention is not limited to this application. That is, the technical concepts of the present invention are equally applicable to conventional video tape cassettes and other magnetic tape cassettes.

What is claimed is:

1. In a magnetic tape cassette of the type comprising fixedly coupled upper and lower half cases of inverted U-shape transverse cross section and U-shape transverse cross section, respectively, said upper half case including a top wall and integral side walls, said lower half case including a bottom wall and integral side walls, said tape cassette incorporating a pair of hubs on which a magnetic tape is wound, said cassette having a front, an opening partially within said cassette front and extending within said bottom wall through which opening said magnetic tape can be pulled out of said cassette, a guard panel movably mounted on said cassette and adapted to close the part of said opening within said cassette front, a slide guard adapted to close the part of said opening within said bottom wall, and a locking member for locking said hubs, the improvement wherein said slide guard is a plate member which is substantially U-shaped in vertical section and which is slidable on the outer surface of the lower half case, said slide guard including right and left-hand side pieces, extending along the side walls of said cassette lower half case, a longitudinal slit on each side of said cassette defined by at least one of said half case side walls and wherein said side pieces of said slide guard each include an inwardly directed overhang projecting within a respective slit and having an outwardly facing surface confronting an inwardly facing surface of one of said half case side walls to maintain slidable engagement of the U-shaped slide guard with the fixedly coupled upper and lower half cases while preventing lateral separation of the side pieces from said lower half case.

2. A magnetic tape cassette as claimed in claim 1, wherein said side piece overhangs include tapered lower surfaces inclined downwardly and inwardly and facing towards said lower half case side walls, respectively, and said side walls of said lower half case include upper edges having tapered surfaces inclined so as to mate with said tapered surfaces of said overhangs.

3. A magnetic tape cassette as claimed in claim 1, wherein said side piece overhangs are formed by right angle inward extensions of said side pieces, which extend beyond the side wall of the lower half case and which are bent downwardly at ends thereof, thus forming grooves into which said side walls of said lower half case reside.

4. A magnetic tape cassette as claimed in claim 1, wherein side walls of said upper half case form flange portions, and wherein said side pieces include portions slidably engaged with lower surfaces of said upper half case and said flange portions.

5. In a magnetic tape cassette of the type comprising fixedly coupled upper and lower half cases of inverted U-shape transverse cross-section and U-shape transverse cross-section, respectively, said upper and lower half cases incorporating a pair of hubs on which a magnetic tape is wound, said upper half case including a top wall and integral side walls, said lower half case including a bottom wall and integral side walls, said fixedly coupled upper and lower half cases further defining a cassette front, an opening partially within said cassette front, and extending within said bottom wall of said lower half case through which opening said magnetic tape can be pulled out of said cassette, a guard panel mounted to said cassette and adapted to close the part of said opening within said cassette front, a slide guard adapted to close the part of said opening within said bottom wall, and a locking member for locking said hubs, the improvement wherein said slide guard is a plate member which is substantially U-shaped in vertical section, and which is slidable on the outer surface of the lower half case, said slide guard including right and left-hand side pieces, said side pieces extending along side walls of said cassette lower half case, aligned longitudinal slits within the side walls of at least one of said half cases and wherein said right and left-hand pieces have integral engaging parts of L-shaped vertical section, including a horizontal portion penetrating said slits respectively, and a vertical terminal portion engaging the inner surface of respective side walls of said upper half case.

6. A magnetic tape cassette as claimed in claim 5, wherein each said engaging parts include a tapered surface facing the top wall of the upper half case, inclined downwardly and outwardly so as in facing the inner surface of the side walls of the upper half case to facilitate the assembly of said upper half case over said slide guard onto said lower half case.

* * * * *